(12) United States Patent
Tasan et al.

(10) Patent No.: US 12,548,138 B2
(45) Date of Patent: Feb. 10, 2026

(54) SYSTEMS AND METHODS FOR IN-SITU, REAL-TIME ADDITIVE MANUFACTURING ANALYSIS

(71) Applicant: Massachusetts Institute of Technology, Cambridge, MA (US)

(72) Inventors: Cemal Cem Tasan, Cambridge, MA (US); Gianluca Roscioli, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 337 days.

(21) Appl. No.: 18/025,560

(22) PCT Filed: Sep. 15, 2021

(86) PCT No.: PCT/US2021/050558
§ 371 (c)(1),
(2) Date: Mar. 9, 2023

(87) PCT Pub. No.: WO2022/060911
PCT Pub. Date: Mar. 24, 2022

(65) Prior Publication Data
US 2023/0289947 A1    Sep. 14, 2023

Related U.S. Application Data

(60) Provisional application No. 63/078,580, filed on Sep. 15, 2020.

(51) Int. Cl.
*G06T 7/00* (2017.01)
*B33Y 30/00* (2015.01)
(Continued)

(52) U.S. Cl.
CPC ............ *G06T 7/0004* (2013.01); *B33Y 30/00* (2014.12); *B33Y 50/02* (2014.12); *G01N 3/46* (2013.01);
(Continued)

(58) Field of Classification Search
CPC ......... G06T 7/0004; G06T 2207/10048; G06T 2207/30144; B33T 30/00; B33Y 50/02;
(Continued)

(56) References Cited

U.S. PATENT DOCUMENTS 5,869,751 A * 2/1999 Bonin ...................... G01B 7/22
361/283.4
6,026,677 A * 2/2000 Bonin ...................... G01N 3/42
361/283.4

(Continued)

OTHER PUBLICATIONS

W. C. Oliver, et al., Journal of Materials Research, pp. 1564-1583, accepted in 1992, published in 2011.
(Continued)

*Primary Examiner* — Md Azad
(74) *Attorney, Agent, or Firm* — Barnes & Thornburg LLP

(57) ABSTRACT

Systems and methods for analyzing mechanical properties in-situ and in real-time of an object being additively manufactured are provided. Such systems can include an inducer (e.g., micro- or nano-inducer) that measures one or more parameters of the object being manufactured, such as a hardness or modulus of material deposited to form the object, and one or more cameras that generate one or more images of the object being manufactured. The measured parameter(s) and generated image(s) can be used by a controller in real-time to generate one or more topographic images of the object being printed and/or one or more 3D-maps of the object being printed. Alternatively, or additionally, the controller can be used to modify parameters that
(Continued)

impact the object being printed, such as parameters associated with the printer or a surrounding print environment. Methods of printing based on such systems are also provided.

19 Claims, 3 Drawing Sheets

(51) Int. Cl.
*B33Y 50/02* (2015.01)
*G01N 3/46* (2006.01)
*G05B 19/4099* (2006.01)

(52) U.S. Cl.
CPC ............... *G05B 19/4099* (2013.01); *G05B 2219/49023* (2013.01); *G06T 2207/10048* (2013.01); *G06T 2207/30144* (2013.01)

(58) Field of Classification Search
CPC ............. G01N 3/46; G05B 19/4099; G05B 2219/49023

USPC ......................................................... 700/118
See application file for complete search history.

(56) References Cited

U.S. PATENT DOCUMENTS

| | | | | |
|---|---|---|---|---|
| 6,122,042 | A * | 9/2000 | Wunderman | A61B 1/0607 356/73 |
| 2007/0022804 | A1 * | 2/2007 | Kley | G01Q 20/02 250/306 |
| 2017/0173695 | A1 * | 6/2017 | Myerberg | B29C 64/106 |
| 2019/0118300 | A1 * | 4/2019 | Penny | B23K 26/032 |
| 2019/0143412 | A1 * | 5/2019 | Buller | B23K 15/0013 219/76.12 |
| 2020/0247061 | A1 | 8/2020 | Putman et al. | |
| 2022/0072620 | A1 * | 3/2022 | Widulle | B23K 26/34 |

OTHER PUBLICATIONS

International Search Report and Written Opinion for Application No. PCT/US2021/050558, dated Nov. 16, 2021 (11 pages).

\* cited by examiner

SYSTEMS AND METHODS FOR IN-SITU, REAL-TIME ADDITIVE MANUFACTURING ANALYSIS

CROSS REFERENCE TO RELATED APPLICATIONS

This application is a U.S. national counterpart application of International Application Serial No. PCT/US2021/050558 filed Sep. 15, 2021, which claims priority to and the benefit of U.S. Provisional Application No. 63/078,580, entitled "Systems and Methods for In-situ, Real-Time Additive Manufacturing Analysis," filed on Sep. 15, 2020, each of which is incorporated by reference herein in its entirety.

FIELD

The present disclosure relates to systems and methods for analyzing mechanical properties of an object that is being additively manufactured, and more particularly relates to the use of cameras and a nano-indenter to perform tests such as hardness tests and scratch tests to analyze mechanical properties of a deposited layer(s) during additive manufacturing to allow for adjustments to printing to be made in view of that analysis in real-time.

BACKGROUND

Additive manufacturing (AM) has become a central technology for rapid prototyping and short run manufacturing, among other uses in the manufacturing industry. It provides users the ability to create unique geometries and unique material compositions, at least in part because print plans can be tailored to achieve desired configurations and properties at particular locations within an entirety of a printed or manufactured object or part. However, even when the same print plan, materials, and AM machine or printer is used to produce multiple objects or parts that are intended to be similar, the actual outcome may not be objects or parts (the terms "object" and "part" are typically used interchangeably herein when referring to something that is being printed) that consistently have the same desired properties. A number of factors may cause inconsistent manufacturing across a series of printed objects that are intended to be similar, including but not limited to variations in the materials used to print, unintended adjustments occurring with the printer, and changes to the environment where the printing is occurring. When the printed object includes undesirable properties, the resulting object may be disposed of, but not typically until after the entire object has been printed, or in some instances, after a series of "bad" objects have been printed. This is because the determination that the object did not meet the desired parameters is not made until after the object(s) have been printed.

There are systems and methods that exist that attempt to head-off potential faulty printing by performing various pre-process and in-process analysis. However, these processes fall short in being able to analyze the printed object itself in a meaningful and productive manner. Pre-process testing can include machine acceptance tests, overall system maintenance, testing for material quality and controlling the same, and process parameter validation, among other testing. To the extent any analysis is performed during the printing process, it is generally limited to monitoring the printing system itself, such as monitoring laser power, oxygen content in a process chamber, monitoring the building platform temperature, the set thickness of a layer, and/or monitoring of a melting process. While these parameters may have some bearing on the resulting object that is printed, its impact is tangential, and thus only semi-informative. For example, process parameters like laser power can vary during the building process and can affect the melting process. In a worst case, this can cause lack-of-fusion based porosity in the printed object. Further, complex geometries can cause non-homogeneous heat transfer (e.g., fast dissipation or accumulation) within the sample, producing local variations in the mechanical properties of the object being produced.

There are also a variety of post-processing testing that can be performed, some of which can be considered destructive—tensile testing, micrographs, etc.—and some which can be considered non-destructive—density scans, CT scans, X-rays, etc. Current testing of samples produced through AM is typically performed post-mortem, according to standards F3122-14, E8/E8M, E21, E1450, E10, E466, and E606. They establish the procedures for the evaluation of the main mechanical properties (e.g., tensile and fatigue) of the samples produced. However, any post-processing analysis does not prevent the printing of an entire part, or multiple parts, before discovering one or more deficiencies in the printed part. Further, traditional destructive and non-destructive testing methods are often expensive and limited in samples size, shape, and density of the material. Due at least in part to inter-build quality variations, it is not possible to test samples of one build in a destructive or non-destructive manner and make conclusions about the quality of the next build, even if it is intended to be identical. Still further, to produce confident results to implement produced parts across an entire platform of manufacturing, such as a fleet of planes in aerospace applications, several tensile specimens need to be produced along with the part in order to obtain statistically valid data, resulting in expensive and time-consuming evaluation.

One technique that is sometimes employed to help monitor AM processes in real-time is using high-rate photodiodes to monitor melt pol mission. Another technique that is sometimes employed to help monitor AM processes in real-time is the use of high-resolution thermal cameras to provide images of heat distribution in a part during the printing process. This can help detect problematic regions by identifying where heat accumulates or dissipates too fast with respect to the rest of the component. Yet another technique that is sometimes employed to help monitor AM processes in real-time is employing acoustical sensors places in the substrate plate to help detect cracking. Notably, none of these techniques provide any real-time feedback about the properties of the object or part that being produced. Rather, these techniques monitor outside factors that may impact the resulting object or part without analyzing the object or part itself.

Accordingly, there is a need for ways to analyze parameters of an object being printed in real-time, including on a layer-by-layer basis, so issues that arise during the manufacturing process can be identified and remedied more quickly. This should lead to less wasted time printing objects that do not meet the desired standards, enhance the quality of the printed objects, and provide for a faster, more consistent printing process across the entirety of a print job.

SUMMARY

The present disclosure provides for systems and methods for analyzing mechanical properties of an object being additively manufactured both in-situ and in real-time. It employs a nano-inducer to directly measure one or more parameters of an object being manufactured, including as each layer is printed. Parameters such as hardness or modulus of the deposited material can be measured by the nano-inducer. Further, one or more cameras are employed to generate one or more images of the object being manufactured. The image(s) can be used in conjunction with the measured parameters(s) to generate, for example, one or more topographic images of the object being printed and/or one or more 3D-maps of the object bring printed. In some instances, a controller can be operated to measure the parameters and/or generate the images, as well as to modify parameters that impact the object being printed, such as parameters associated with the printer or a surrounding print environment.

One exemplary embodiment of a system for analyzing properties of a printed object in-situ, in real-time, includes an inducer, at least one camera, and a controller. The inducer is configured to measure one or more parameters of an object being printed by an additive manufacturing printer. The camera(s) is configured to generate one or more images of the object being printed by the additive manufacturing printer. The controller is configured to receive the one or more parameter(s) of the object being printed that is measured by the inducer and the one or more image(s) of the object being printed that is generated by the at least one camera(s) and modify at least one of one or more print parameters, one or more environment parameters, or one or more other variables associated with one or both of the additive manufacturing printer or a print environment in response to the one or more parameters of the object being printed or the one or more images of the object being printed.

The camera(s) can include an infrared camera and/or a thermal camera, and the image(s) generated by the camera(s) can be one or more thermal images. Alternatively, or additionally, the camera(s) can include a charge coupled device camera and/or an optical camera, and the image(s) generated by the camera(s) can include one or more stereoscopic images.

A stage can be included as part of the system. The stage can be configured to be a location where the object being printed is formed. It can also be configured to be moved between a printing area of the system and a testing area of the system. The printing area can be where the additive manufacturing printer deposits material to from the object being printed, and the testing area can be where the inducer is configured to be operated to measure one or more parameters of the object being printed. In some embodiments, the stage can be rotatable to selectively move one or more zones of the stage between the printing area and the testing area of the system. Alternatively, or additionally, the stage can be configured to move substantially along a Z-axis, substantially perpendicular to a surface area of the stage configured to be the location where the object being printed is formed. This can allow the object being printed to have a third-dimension.

The parameters(s) of the object being printed that is measured by the inducer can include at least one of a hardness of material deposited to form the object being printed or a modulus of material deposited to form the object being printed.

The additive manufacturing printer can be part of the system as well. In some such embodiments, the additive manufacturing printer can be configured to operate using at least one of the following techniques: powder bed fusion, material extrusion, material jetting, binder jetting, directed energy deposition, vat photopolymerization, sheet lamination, or hybrid. In instances in which the technique used includes powder bed fusion, the system can include at least one energy source and at least one moveable mirror. The energy source(s) can be configured to fuse powder to form the object being printed, and the moveable mirror(s) can be configured to be adjusted to control a location at which the energy source(s) fuses powder to form the object being printed. In embodiments in which the controller is configured to modify the print parameters, it can be done so in response to the parameter(s) of the object being printed or the image(s) of the object being printed. The print parameter(s) being modified can be associated with the additive manufacturing printer.

In some embodiments, the inducer can be a nano-inducer. A size of one or more indents formed by the inducer in the object being printed can be approximately in the range of about 10 nm to about 100 μm. The inducer can be configured to form the one or more indents in the object being printed with a single phase or grain of the object being printed. The controller can further be configured to perform at least one of the following tasks: (1) generate one or more topographic images of the object being printed; (2) generate one or more 3D-maps of the object being printed;

Alternatively, or additionally, in some embodiments, the inducer can be a micro-inducer. A size of one or more indents formed by the micro-inducer in the object being printed is approximately in the range of about 1 μm to about 1 mm. The inducer can be configured to form the one or more indents in the object being printed includes different phases and crystallographic grains.

In some embodiments, the system can include a microscope configured to image the one or more indents formed in the object being printed and measure a size of the one or more indents formed by the inducer to determine average properties of the object being printed.

One exemplary method of analyzing one or more mechanical properties of an object being additively manufactured includes depositing a layer of material to form a layer of an object being additively manufactured, measuring at least one of a hardness of at least a portion of the layer of material or a modulus of at least a portion of the layer of material, and depositing another layer of material to form an additional layer of the object being additively manufactured.

The method can include imaging at least one of a portion of the layer of material or at least a portion of the another layer of material. In some such embodiments, the imaging action can further include generating one or more thermal images of the at least one of a portion of the layer of material or a portion of the another layer of material. Likewise, or alternatively, the imaging action can further include generating one or more stereoscopic images of the at least one of a portion of the layer of material or a portion of the another layer of material. The imaging action can include generating one or more topographic images of layers of the object being additively manufactured. The layers can include the deposited layer of material. Additionally, or alternatively, the imaging action can include generating one or more 3D-maps of layers of the object being additively manufactured. The layers can include the deposited layer of material.

In some embodiments the method can include modifying print parameter(s), environment parameter(s), and/or one or more other variables associated with one or both of an additive manufacturing printer used to deposit the layer of material or a print environment. Such modification(s) can be in response to at least one of the measured hardness of at least a portion of the layer of material or the measured modulus of at least a portion of the layer of material. In instances in which the method includes imaging at least one of a portion of the layer of material or at least a portion of the another layer of material, the method can further include modifying at least one of one or more print parameters, one or more environment parameters, or one or more other variables associated with one or both of the additive manufacturing printer used to deposit the layer of material or the print environment. This can be done in response to the generated thermal image(s), the stereoscopic image(s), the generated topographic image(s) of layers of the object being additively manufactured, and/or the generated 3D-map(s) of layers of the object being additively manufactured.

The method can further include moving a build platform on which the object being additively manufactured is built. This can move the object being additively manufactured between a printing area, where the depositing actions occur, and a testing area, where the measuring action occurs. Movement can include, for example, rotating the build platform and/or moving the build platform substantially along a Z-axis, substantially perpendicular to a surface area of the build platform on which the objected being additively manufactured is formed. The latter of these movements can allow the object being printed to have a third dimension.

The additive manufacturing technique(s) used to form the object being additively manufactured can include: powder bed fusion, material extrusion, material jetting, binder jetting, directed energy deposition, vat photopolymerization, sheet lamination, and/or hybrid. In instances in which the technique used includes powder bed fusion, the method can include directing an energy source towards a mirror to direct energy from the energy source to the object being printed. This, in turn, can fuse powder to form the object as desired. In some such embodiments, the method can include moving the mirror to control a location to which the energy from the energy source is applied to the powder forming the object.

In some embodiments, measuring at least one of a hardness of at least a portion of the layer of material or a modulus of at least a portion of the layer of material can further include forming one or more of indents in the portion of the layer of material. The method can include actuating an indenter column to form the one or more indents in the portion of the layer of material. In some such embodiments, the indenter column can move in one or more of an X-direction or a Y-direction across the portion of the layer of material to provide a scratch on the layer that generates at least one of lateral force measurements or friction data. The method can further include imaging the one or more indents and measuring a size of the one or more indents formed by the inducer to determine average properties of the object being additively manufactured. The one or more indents can be a nano-indentation, with a size of the nano-indentation being approximately in the range of about 10 nm to about 100 μm, while in some embodiments, the one or more indents can be a micro-indentation, with a size of the micro-indentation being approximately in the range of about 1 μm to about 1 mm.

BRIEF DESCRIPTION OF DRAWINGS

This disclosure will be more fully understood from the following detailed description taken in conjunction with the accompanying drawings, in which.

DESCRIPTION

Figure 1:
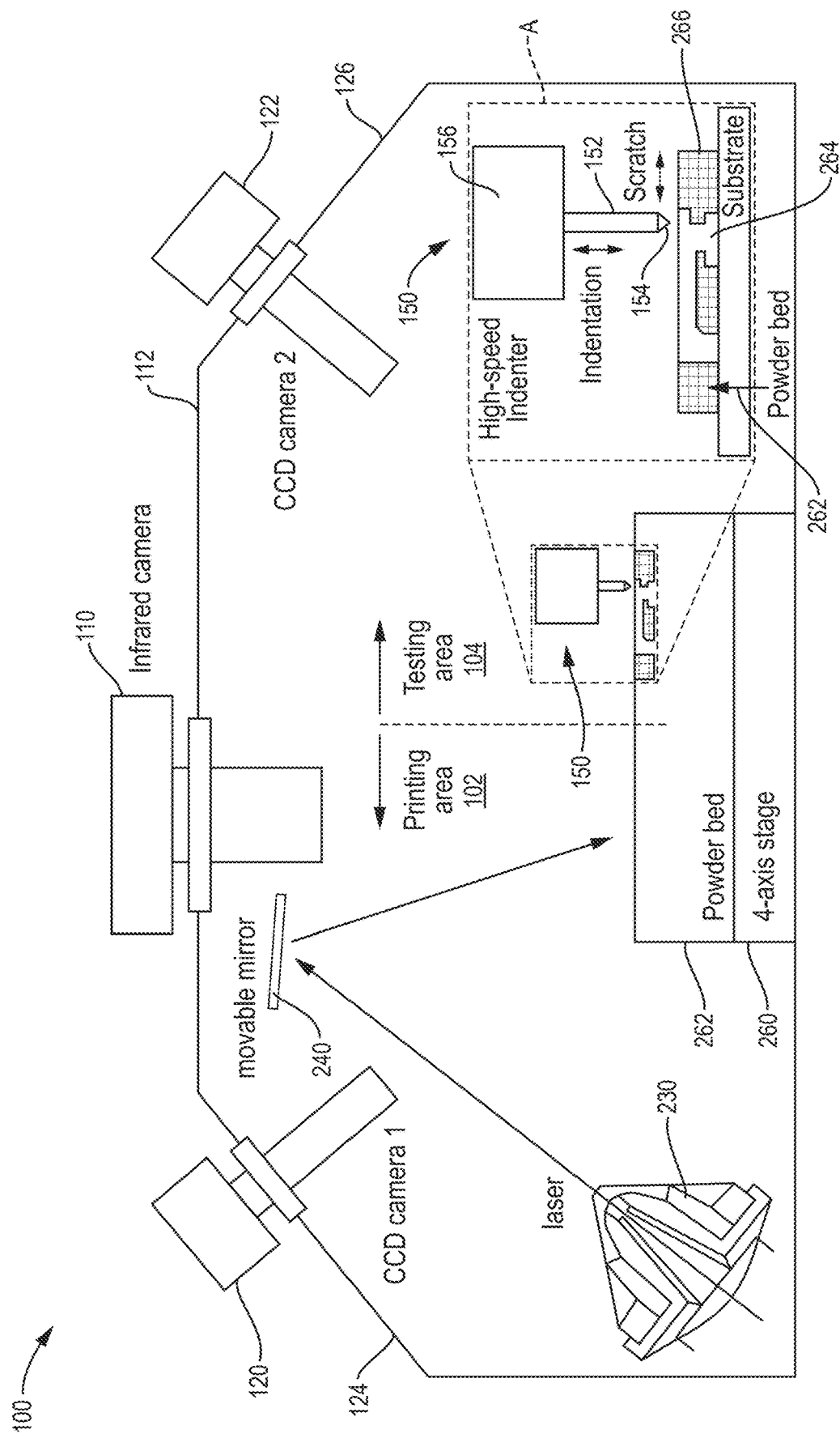
FIG. 1 is a schematic illustration of one exemplary embodiment of a system for analyzing additive manufacturing.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Terms commonly known to those skilled in the art may be used interchangeably herein, such as the terms "print" and "manufacture," and variations thereof.

To the extent features, sides, components (e.g. cameras), steps, or the like are described as being "first," "second," "third," etc., such numerical ordering is generally arbitrary, and thus such numbering can be interchangeable. Likewise, to the extent features are described as being disposed on top of, below, next to, etc. such descriptions are typically provided for convenience of description, and a person skilled in the art will recognize that, unless stated or understood otherwise, other locations and positions are possible without departing from the spirit of the present disclosure. Terms such as directions and axes may be used interchangeably herein such that movement described as being substantially in an X-direction, Y-direction, or Z-direction can be substantially along an X-axis, Y-axis, or Z-axis, respectively. Further, the present disclosure includes some illustrations and descriptions that include prototypes, bench models, or schematic illustrations of set-ups. Moreover, the terms "inducer" and "indenter," as used, for example, when referring to a nano-inducer or a nano-indenter, can be used interchangeably herein to refer to a device that forms indents in a surface of a printed object to measure parameters thereof. A person skilled in the art will recognize how to rely upon the present disclosure to integrate the techniques, systems, devices, and methods provided for into a product and/or production method, such as a consumer-ready, factory-ready, or lab-ready additive manufacturing (AM) printer. The terms AM and 3D-printing may be used herein interchangeably.

The present disclosure provides for systems that are designed to make real-time assessments of properties of an object or part (the terms "object" and "part" are typically used interchangeably herein when referring to something that is being printed) that is bring printed using additive manufacturing techniques. The system uses a combination of cameras, mirrors, and an indenter to determine various parameters of the object (sometimes referred to herein as "object parameters" or "part parameters") being printed. These parameters can then be analyzed to take various actions related to the printing in real-time, including but not limited to changing one or more print parameters (i.e., parameters associated with the AM printer itself that will have an impact on the resulting object being printed), terminating a print job, or taking some other action that impacts the resulting object being printed. The analysis can be performed by a controller(s) or other mechanisms known to those skilled in the art, and the responsive actions can also be performed by a controller(s), including but not limited to the same controller(s) performing the analysis, by one or more users monitoring the print job, and/or an outside system that is in communication with the AM printer to adjust print parameters and/or the object being printed.

FIG. 1 provides for one exemplary embodiment of an analysis system 100 configured to be used with an AM printer (not shown) for purposes of analyzing parameters of the object being printed by the AM printer. The system 100 includes one or more cameras (as shown three cameras 110, 120, 122), one or more energy sources (as shown one, a light source or laser 230), one or more mirrors (as shown one mirror 240), one or more indenters or inducers (as shown one nano-indenter, or nano-inducer, 150, though it will be appreciated that the indenter can be a micro-indenter, or micro-inducer, as described in greater detail below), one or more build platforms or printing stages (as shown one stage 260), and one or more controllers (not shown, but see the controller 800 of FIG. 5) to communicate and/or operate various aspects of the system and/or the AM printer in response to analyzed parameters. The analyzed parameters include the object parameters, and can also include other parameters, such as print parameters and environment parameters (e.g., pressure inside a build chamber in which the printing stage is disposed). These system components can be mixed and matched as desired, with each providing various benefits as articulated herein or otherwise recognizable by a person skilled in the art. In some instances, not all of these components will be part of a single system, and instead may be provided from outside of the system. For example, the analysis system 100 may only include one camera 110, the indenter 150, the stage 260, the mirror 240, and the controller, with other aspects being outside components, such as additional cameras (e.g., the cameras 120, 122) and/or an energy source (e.g., the laser 230). Alternatively, the stage 260 and/or mirror 240 may also be outside of the analysis system 100. Various combinations of the components described herein can be selectively used in a system without departing from the spirit of the present disclosure, and most any combination is an acceptable combination for use in providing the desired analysis. The foregoing notwithstanding, the inclusion and use of the indenter 150 provides some benefits not previously realized in AM systems, and systems that monitor AM printers, before. Further, the analysis systems provided for herein, like the system 100, can be standalone systems that can be used in conjunction with AM printers, or the systems, or components thereof, can be incorporated into AM printers directly. A person skilled in the art will recognize that some of the components illustrated in the system 100, such as the energy source 230, the mirror 240, and the stage 260, may be part of the AM printer, and thus may or may not be considered part of the analysis system.

For ease of illustration, the analysis system 100 of FIG. 1 is described with respect to an AM printer, but components of the AM printer are not illustrated. Accordingly, while the illustrated embodiment is described with respect to using a power bed fusion AM printing technique, some components that can be part of such a printer are not illustrated, such as a powder chamber to house powder to be deposited, a coating roller to deposit a layer of powder on the build platform and/or on previously deposited powder, and/or a scrapper, blade, or leveling roller to aid in creating a desired and/or uniform thickness of deposited powder. A person skilled in the art will recognize how these components can be integrated in conjunction with the provided for analysis system 100, and thus it is unnecessary to include all the components of an AM printer in the illustrated figure. As described herein, some are provided for in the illustrated embodiment, and at least some such components can be part of the analysis system 100 or can be part of the AM printer.

Likewise, because powder bed fusion AM printing techniques are known to those skilled in the art, it is unnecessary to describe how the printing technique operates in substantial detail. Rather, a person skilled in the art will understand that the printing technique generally involves loading or otherwise obtaining a print plan for the object to be printed, depositing a layer of powder onto the build platform and/or on previously deposited powder, possibly leveling that deposited layer to a desired thickness, and then operating an energy source (e.g., laser, electron beam), as shown the energy source 230 deflected by the movable mirror 240, to melt the deposited layer of powder, illustrated as a bed of powder 262 in view of multiple layers having been printed, selectively based on the print plan inputted into or otherwise communicated to the AM printer. The moveable mirror 240 can be moved in any of the X, Y, and Z-directions or axes to direct the energy source 230 to the portions of the powder 262 to be fused by the laser. Alternatively, or additionally, the energy source 230 itself can be moved to help direct the laser to desired locations for fusion of the deposited powder at desired locations. While the illustrated embodiment illustrates a single energy source 230 and movable mirror 240, one or more additional energy sources and/or one or more additional mirrors can be used without departing from the spirit of the present disclosure. It will further be appreciated that the number of energy sources does not have to match the number of mirrors, with a smaller or greater number of energy sources than number of mirrors being used in various embodiments.

Once the printed layer has been scanned and fused, the build platform 260 can be lowered and/or one or both of a powder chamber (not shown) and/or a coating roller (not shown) can be raised, with one or more additional layers being subsequently printed and fused based on the print plan. As shown in larger detail in the breakout box A of FIG. 1, the layer-by-layer printing and fusing forms an object or sample 264, with unfused powder 266 eventually being removed. A person skilled in the art will appreciate variations, additions, and/or departures from the techniques described herein that can occur without departing from the spirit of the disclosure. The analysis system 100 provided for herein allows for each layer to be analyzed in-situ, in real-time, directly after a layer is deposited and fused.

Further, before describing the in-situ, real-time analysis, it should be noted that while in the illustrated embodiment the printed object 264 is formed using one type of powder bed fusion AM printing technique, as shown selective laser melting (SLM), other powder bed fusion AM printing techniques can be used, including but not limited to selective heat sintering (SHS), selective laser sintering (SLS), laser cusing, direct metal laser sintering (DMLS), and electron beam melting (EBM). Still further, while the illustrated embodiment provides for a powder bed fusion AM printing technique, a person skilled in the art will appreciate that other AM techniques can also be used in conjunction with the present disclosures, including but not limited to material extrusion, material jetting, binder jetting, directed energy deposition, vat photopolymerization, sheet lamination, and hybrid techniques.

One aspect of the analysis system 100 is the indenter 150, which is illustrated in larger detail in the breakout box A of FIG. 1. The indenter 150 includes an indenter column 152 having a pointed distal end or tip 154 that is mechanically operated by a control system (not shown, but see the controller 800 in FIG. 5) disposed in a housing 156. The indenter column 152 can be actuated in a Z-direction as shown to move into and out of the printed layer, sometimes referred to as a stroke, providing an indent that can be used to analyze a parameter of the material such as hardness and/or elastic modulus. Moreover, in some embodiments, the indents can be used to measure fracture toughness and hydrogen-embrittlement. Analysis of indents assess toughness in a local manner can enable repair of the printed object during printing, thereby reducing rejection rates for produced object. A person skilled in the art will recognize that printed parts often suffer from brittleness due to the particular solidification substructure that develops during powder melting and solidification. Once measured, these parameters, e.g., hardness, elastic modulus, fracture toughness, and hydrogen embrittlement, can be measured during printing and compared to a material hardness database to determine whether the printed object is to be rejected or if printing should proceed.

In some embodiments, the nano-indenter 150 can operate approximately in the range of about 0.1 strokes per second to about eight strokes per second and can press into the object at a depth approximately in the range of about 10 nanometers to about 100 micrometers. Additionally, the indenter column 152 can be actuated in at least one of an X-direction as shown or Y-direction (into the illustrated page) to move across the printed layer, providing a scratch test on the printed layer that generates lateral force measurements, as well as friction data, for the material, which can be representative of hardness and wear resistance of the portion being analyzed. The tip 154 can be moved quickly and carefully, in a non-destructive manner (i.e., without causing lasting damage to the printed object), across any portion of the surface of the object to be analyzed up to and including the entire surface. Each movement into the surface of the object being printed is a micro-indentation. The accumulation of information generation from the micro-indentations can be used to analyze how the structure of the material being printed is developing. For example, the information generated by the indenter 150 can be used to create a 3D-map of the morphology of the object. The indenter 150 used in this context can provide accurate topographic images of each layer being printed, which can be used to identify possible defects or artifacts, for example due to lack-of-fusion or asperities formation. Information about the topography of the printed object can help identify locations where more or less powder should be placed to achieve the desired results, with such change in powder application or distribution being able to be made automatically by the system 100 (e.g., a controller, as discussed below, for example with respect to FIG. 5) and/or by a user. The system 100 allows information of this nature to be generated even without obtaining information about the microstructure of the object being printed, which typically requires either optical or electron microscopy techniques.

The control system that actuates the indenter column 152 can be any components capable of moving the indenter column 152, and may include a motor, springs, coils and magnets, and/or coils, among other actuating parts. After a layer is printed, and the indenter 150 has been operated to analyze the desired parameters of that layer, if the build platform subsequently moves substantially in the Z-direction to allow for another layer to be printed, the housing 156 of the indenter 150 may not move in the Z-direction. However, the system 100 more generally, and the indenter 150 more particularly, can be configured to translate substantially in the Z-direction as desired to position the indenter 150 at a desired location with respect to a printed object so that the indenter 150 can directly obtain the desired mechanical properties for each layer of the object being created. Likewise, if desired, the system 100 more generally, and the indenter 150 more particularly, can be configured to translate in one or both of the X and Y-directions to allow the indenter 150 to obtain desired mechanical properties at any desired location of the printed object. A person skilled in the art will appreciate various mechanical designs that can be implemented to allow for the indenter 150 to translate in any of the X, Y, and Z-directions. Further, although the present disclosure refers to the indenter 150 as a nano-indenter, in other contexts the indenter may not be on a nano-scale. The size of the indenter 150, and the strokes made by the indenter to take is measurements can depend, at least in part, on the size of the object being printed and/or the size of the system 100 and/or the AM printer(s) with which it is being used.

The indenter 150 can be a nano-indenter, as discussed above, or a micro-indenter. In some embodiments, the indenter 150 can be high-speed indenter, e.g., a high-speed nano-indenter or a high-speed micro-indenter, which allows the indenter 150 to make indentations at a rate approximately in the range of about 3.5 minutes per indent to about 10 indentations per second, or about 6 indentations per second in the case of some nano-indenter applications, or approximately in the range of about 5 seconds per indent to about 15 seconds per indent in the case of some micro-indenter applications. A person skilled in the art will recognize that the above-referenced ranges of indentation rate are merely exemplary and that the indenter can have additional parameters that can categorize the indenter as being a high-speed indenter. The configuration of the system 100 can differ based on the type of indenter being used. For example, the micro-indenter, due to being larger than the nano-indenter, creates an indent that is larger than that of the nano-indenter. To measure a size of the indent such that a hardness value of the material can be obtained, the system 100 can further include an optical microscope (not shown) in conjunction with the micro-indenter. The optical microscope can image the indent formed on the material, measure the size of the indent (which can depend, at least in part, on the shape of the tip 154 used), and pass the information to the controller 800 to derive a hardness value of the material by mathematical calculations known to one skilled in the art. The optical microscope can be positioned proximate to the powder bed such that the microscope can view the testing area 104. In some embodiments, the optical microscope can be disposed in the housing 156 as one of a plurality of tools used in conjunction and/or as part of the system 100. The tools can include, for example, the indenter column 152 and one or more tools for measuring the parameters of the indents, such as optics (e.g., microscope lenses of varying magnification). When mounted, for example, the housing 156 can rotate between the indenter column 152 and the other tools (e.g., microscope lenses) for use in the printing and/or the testing area, much the way microscope lenses of various magnifications can be rotated in and out to be used to view a sample on a platform of the microscope at the various magnifications. In other embodiments, the various tools (indenter column(s), optics, etc.) can be separately disposed proximate to the printing and/or testing areas.

By way of comparison, the nano-indenter can use a smaller indent that is connected to a transducer that is able to provide a plot of the load measured during the indentation with respect to the position of the indenter. From the slope of the unloading curve, it is possible to obtain the hardness of the material and a reduced Young's modulus value, which can be applied to determine the actual modulus in accordance with mathematical calculations known to one skilled in the art (see, e.g., "An improved technique for determining hardness and elastic modulus using load and displacement sensing indentation experiments" by W. C Oliver, et al., in the *Journal of Materials Research*, pages 1564-1583, accepted in 1992, published in 2011, and available at http://link.springer.com/article/10.1557/JMR.1992.1564, the contents of which is incorporated by reference herein in its entirety). In some embodiments, the nano-indenter can be used to obtain a topographic image of the surface of the object by moving the indenter 150 in parallel lines along across the surface thereof.

Differences between the micro-indenter and the nano-indenter discussed above include that they can produce varying values for hardness and modulus of a material. Micro-indenters can be used for direct print homogeneity validation as a quality control check for simple materials. For example, the aforementioned optical microscope can be used to analyze the large indents formed by a micro-indenter, with large in comparison to the size of the indents formed by a nano-indenter, to measure average properties of the material due to different phases and crystallographic grains formed under the indent. In some embodiments, the indents formed by the micro-indenter that are used to measure average properties of the material can be approximately in the range of about 1 µm to about 1 mm, though in some embodiments, the indents can be approximately in the range of about 20 µm to about 1 mm. Use of the micro-indenter results in a small number of indents across the surface of the object, which can be measured via a binary "yes-or-no" test to determine whether there are problems with the object during printing.

Figure 4:
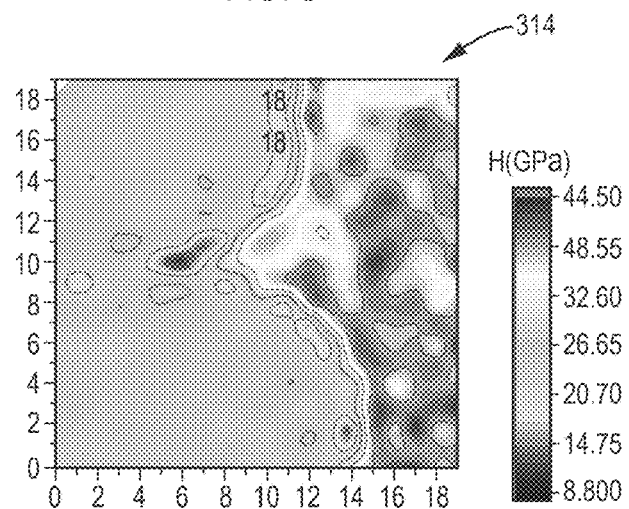
FIG. 4 is a thermal image of a part being formed using the system of FIG. 1.

Comparatively, the nano-indenter can be used to track specific properties that are desired locally in certain regions of the printed object. For example, indents formed by the nano-indenter are significantly smaller, e.g., approximately in a range from about 10 nm to about 100 µm, than those of the micro-indenter such that the indents fall within one single phase or grain of the material to not be destructive to the material. As a result, hardness and modulus measurements can produce a large scattering of values due, at least in part, to a first indent in one part of the surface being made in a grain of the material that differs significantly from another grain of the material in which a second indent is formed. Accordingly, nano-indenters can be harder to implement than micro-indenters due to values measured by indents formed by the nano-indenter giving rise to a statistical approach to the interpretation of the data for hardness and modulus, where lower hardness values can be attributed to defects in the material as well as to different phases of the material. Rather than resulting in a binary test, as with the micro-indenter, use of the nano-indenter can provide a large amount of data that can be formed into a two-dimensional property map, e.g., real-time thermal image 314, as shown in FIG. 4 below, which can be interpreted to probabilistically determine values of hardness and modulus across the printed part.

Another aspect of the analysis system 100 can be a high-speed, infrared or thermal camera 110. As shown, the camera 110 can be positioned above the build platform 260 so it can obtain a real-time thermal image of the object as it is being printed, which in turn can help detect any heat inhomogeneity in the object. This can help, for example, determine if the fusion of the material is working properly and/or that it is occurring at the desired locations. The infrared camera 110 is often stationary, but in some embodiments it can be configured to translate in any of the X, Y, and Z-directions, whether simultaneously, in two directions at the same time, or just in a single direction. Known techniques can be used to move the camera 110 as desired. Noting that the illustrated embodiment is a schematic illustration, while the infrared camera 110 appears to be mounted or otherwise disposed on a bar 112 of some sort, this may or may not be true in an actual set-up. It can be, but the bar 112 is mainly provided for illustrative purposes to easily show how the camera 110 can be positioned with respect to the build platform 260. Any techniques known for positioning a camera at a desired location with respect to desired imaging area (i.e., the build platform 260 and surrounding area) can be used. Further, while the illustrated embodiment provides for a single thermal or infrared camera 110, additional thermal or infrared cameras can be used if doing so would be beneficial to the in-situ, real-time analysis of the printed object.

Still another aspect of the analysis system 110 is at least one charge-coupled device (CCD) or optical camera 120, 122. In the illustrated embodiment, two CCD cameras 120, 122 are shown, one camera 120 disposed on one side along the X-axis of the build platform 260 and the second camera 122 disposed on an opposite side along the X-axis of the build platform 260. The CCD cameras 120, 122 can be used to provide stereoscopic imaging, which in turn can help identify possible macro-defects in the printed object, such as an issue with powder distribution or other print parameters. Similar to what is described with respect to the infrared camera 110, the thermal cameras 120, 122 are often stationary, but in some embodiments one or both can be configured to translate in any of the X, Y, and Z-directions, whether simultaneously, in two directions at the same time (e.g., the X and Z-directions along schematically illustrated bars 124, 126), or just in a single direction. Known techniques can be used to move the camera(s) 120, 122 as desired. Likewise, the illustrated bars 124, 126 are provided in a schematic context, and the CCD cameras 120, 122 may or may not be mounted or otherwise disposed on a bar of some sort. Any techniques known for positioning a camera at a desired location with respect to desired imaging area (i.e., the build platform 260 and surrounding area) can be used. Further, while the illustrated embodiment provides for two CCD cameras 120, 122, in some instances only one CCD camera may be used, while in other instances more than two CCD cameras can be used.

As shown, the stage or build platform 260 is the location that helps define where the in-situ, real-time analysis is going to occur. The stage 260 can be part of the analysis system 100 and/or part of the AM printer. In some embodiments, the stage 260 can be housed in a build chamber of the AM printer, with the build chamber being able to be environmentally controlled, such as by creating a partial or full vacuum with the build chamber as desired and/or providing an inert gas therein to protect a molten material from corroding. In the schematic illustration of FIG. 1, there is an area illustrated as a "printing area" 102 and an area illustrated as a "testing area" 104. These labels are identified in this instance from the perspective of the system 100, as opposed to the perspective of the object or part being printed. Thus, a portion or area of the system 100 can be devoted to where the printing occurs, and another portion or area of the system 100 can be devoted to where the testing occurs. Alternatively, or additionally, it could be such that only a portion of the object being printed is tested, but as designed the present system 100 allows for an entire surface area of each layer of a printed object to be tested.

Figure 2:
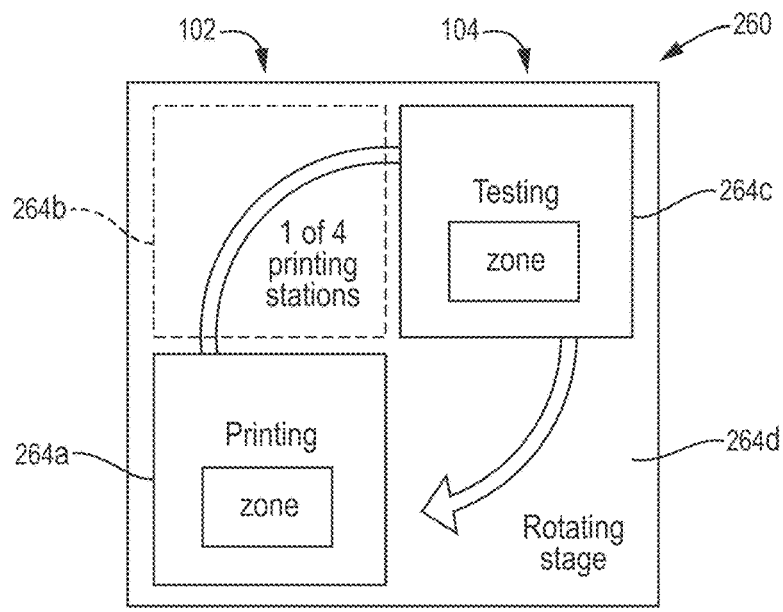
FIG. 2 is a schematic top view of a stage of the system of FIG. 1.

More particularly, and as illustrated in greater detail in FIG. 2, the stage or build platform 260 can be a four-axis stage configured to rotate in the X and Y-directions to allow the printed object to be moved between the printing and testing areas 102, 104. As shown, the rotating stage 260 has four identified printing stations or quadrants 264a, 264b, 264c, and 264d, and each of the four printing stations 264a, 264b, 264c, and 264d can be rotated, for example in a clockwise direction as illustrated, into and out of the printing and testing areas 102, 104. In the illustrated embodiment the printing station 264a is identified as the printing zone and the printing station 264c is identified as the testing zone, with the printing and testing zones being subsets of the respective printing and testing areas 102, 104 and being kiddy-corner to each other. The other two stations 264b, 264d are open areas, with the station 264b being an area where the printed object can cool prior to being tested. In other embodiments, printing can occur in both stations 264a, 264b that fall within the printing area 102 as identified in FIG. 1 and testing can occur in both stations 264c, 264d that fall within the testing area 104 as identified in FIG. 1.

The printing area and testing area can at least partially, or even completely, overlap, such as in small 3D printer set-ups. Such a system may have an increase in printing time as a result of accounting for cool-down time that may be necessary between the time the material is fused and the time the materials is to be tested by the nano-indenter and/or the testing time, i.e., the amount of time it takes for the indenter to perform the measurement(s). The cool-down time may be necessary for the temperature distribution to become substantially uniform in the testing area prior to the testing occurs. For larger set-ups, complete spatial separation between the printing and testing areas can be achieved. This physical separation can allow for printing and testing on two different stations at the same time, thus not causing dramatic increase in print times while providing insights on material properties and microstructure.

A person skilled in the art will understand that a stage can be divided less (e.g., two or three printing areas) or more (e.g., more than four printing areas) without departing from the spirit of the present disclosure. Further, while in the illustrated embodiment each printing station 264a, 264b, 264c, and 264d has a substantially equal surface area, in other embodiments one or more of these stations can have a different surface area. Still further, and as described above, in addition to rotating, the stage 260 can be configured to move substantially in the Z-direction, i.e., along a Z-axis, after a layer is deposited and fused to allow for the next layer to be deposited onto the previously printed layer and/or the stage 260 without necessarily having to move the other components of the AM printer (e.g., the coating roller) or the analysis system 100 (e.g., the indenter 150). Further, while in the illustrated embodiment the stage 260 is rotatable, other types of movements can be used in lieu of or in combination with a rotating motion of the stage to move object being printed between the printing area 102 of the system 100 and the testing area 104 of the system, such as translational and lateral movement using techniques known to those skilled in the art for creating such movement.

The system 100 and/or the AM printer can include one or more controllers (not shown) that can assist in performing the various functions associated with the system 100 and/or printer. While controllers are not illustrated, a person skilled in the art, in view of the present disclosures, will understand how controllers can be integrated with the system 100 and/or the AM printer to achieve desired performance results. For example, one or more controllers can be operated to carryout a print plan, operate the various components of the system (e.g., the cameras 110, 120, 122, the indenter 150, the stage 260) and/or the printer (e.g., the powder chamber, the coating roller, the energy source 230, the mirror 240, the stage 260), and/or be involved in the receipt and/or analysis of the data generated by the analysis system 100. A person skilled in the art will understand how a controller(s) can be operated in relation to carrying out a print plan, and thus further detail is not needed. Likewise, even though the analysis system 100 provided for herein is new at least within the context of AM, a person skilled in the art will understand how a controller(s) can be operated in relation to carrying out certain functions of the described system 100 and/or of the AM printer, such as operating cameras 110, 120, and 122, an indenter 150, and/or a stage 260 as provided for herein. The use of one or more controllers in the context of receiving and using the in-situ, real-time data generated by the analysis system 100 likely warrants additional details, however, since prior to the present disclosure, data of the part being printed was not gathered and/or used.

The controller(s) can be in communication with any or all of the components of the analysis system 100 that are generating data to be relied upon for monitoring the development of the object as it is being printed. This includes the indenter 150, the thermal camera 110, and the CCD cameras 120, 122. This can also include other parameters beyond the object parameters, such as the print parameters and environment parameters. The received parameters can be analyzed individually, collectively, or as a subset thereof. The analysis can be based, for example, on predetermined threshold values where if a threshold value is met (or exceeded or fallen short of), a particular action is dictated by the controller(s). For example, if is it is determined the material is too stiff, actions can be taken to change print parameters to reduce the stiffness in that level and/or in future levels. The resulting instruction from the controller(s) could be to terminate printing immediately to conserve material. The threshold value(s) can be user-defined, from known tables, from testing, and/or from a combination thereof.

Figure 3:
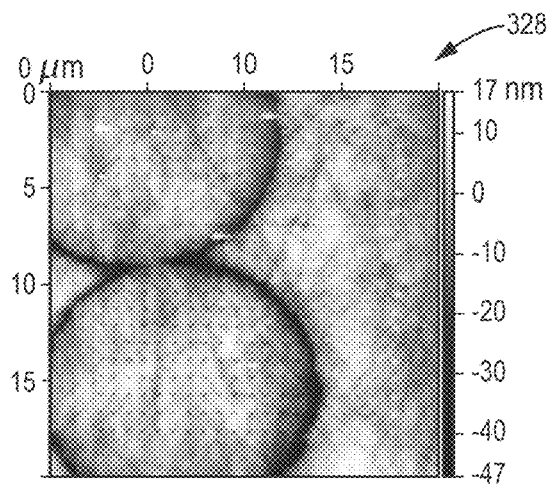
FIG. 3 is a stereoscopic image of a part being formed using the system of FIG. 1.

The parameters monitored by the indenter 150 can be used by the controller(s) in conjunction with parameters monitored by other aspects of the analysis system 100, print parameters, and/or environment parameters. For example, as shown in FIG. 3, a stereoscopic image 328 is provided from the CCD cameras 120, 122. This image 328 can detect possible macro-defects, which can result from a problem with powder distribution or print parameters. Further, this information can be combined with the parameters monitored by the indenter 150 to make a more complete analysis of the printed layer, and thus the printed object. Likewise, a real-time thermal image 314 taken by the high-speed infrared camera 110, as shown in FIG. 4, can be used in a similar manner. This image 314 can help detect any heat inhomogeneity in the part, and when combined with the information from the indenter 150, and possibly the stereoscopic image(s) (e.g., the image 328) from the CCD cameras 120, 122, a more complete analysis of the printed layer, and thus the printed object, can be made. As described above, topographic images of each layer being printed and/or 3D-maps of the morphology of the object can be created based on parameters measured by the indenter 150, and information generated by the infrared camera 110 (e.g., the image 314) and the CCD camera 120, 122 (e.g., the image 328) can also be used to help generate such topographic images and/or 3D-maps, among other information. Such images, alone or in combination with other parameters, can provide information about where more and less powder should be placed in that layer and/or in subsequent layers to achieve desired results.

Figure 5:
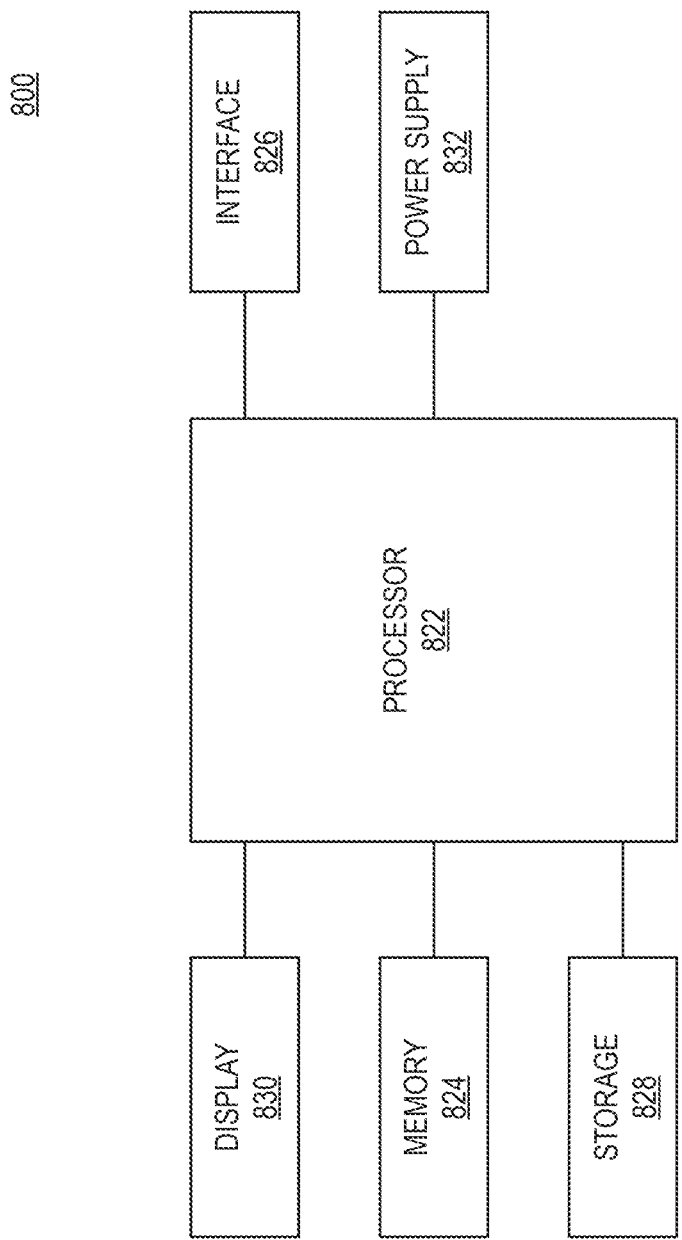
FIG. 5 is a schematic block diagram of one exemplary embodiment of a computer system for controlling one or more aspects of the system of FIG. 1 and/or an additive manufacturing printer operated in conjunction with the system of FIG. 1.

FIG. 5 illustrates a block diagram of the physical components of an exemplary embodiment of a controller or other computer 800 that can be used to help control the various features of the analysis system and/or an AM printer used in conjunction with the same, as well as analyze the data received from the system, an AM printer, and/or an environment. For example, as described above, the controller 800 (or a plurality of controllers) can use the data or information measured and/or generated by the indenter 150, the infrared camera 110, the CCD cameras 120, 122, and other data or parameters measured or other inputted into the system 100 (e.g., print parameters, environment parameters) to generate data or information such as topographic image(s) and/or 3D-map(s) described above. Such information can be displayed to a user, such as on a display device (e.g., screen or other devices described below or otherwise known to those skilled in the art) or otherwise outputted for viewing by the user (e.g., printed, such as on paper or other medium). Additionally, or alternatively, the controller 800 (or a plurality of controllers) can be used to modify print parameters, environment parameters, and/or other variables associated with the printer and/or the print environment in real-time in response to the parameters received by the controller(s) 800 and/or the data or information (e.g., topographic image(s), 3D-map(s)) to adjust the print plan, and thus the printed object, in real-time. Although an exemplary computer 800 is depicted and described herein, it will be appreciated that this is for sake of generality and convenience. In other embodiments, the controller or computer 800 may differ in architecture and operation from that shown and described here. The computer 800 can be a tablet computer, mobile device, smart device, wearable device, smart phone, laptop computer, desktop computer, cloud-based computer, server computer, multiple of the above, and so forth.

The illustrated computer 800 can include a processor 922 that controls the operation of the computer, for example, by executing embedded software, operating systems, device drivers, application programs, and so forth. The processor 922 can include any type of microprocessor or central processing unit (CPU), including programmable general-purpose or special-purpose processors and/or any of a variety of proprietary or commercially-available single or multi-processor systems. As used herein, the term processor can refer to microprocessors, microcontrollers, ASICs, FPGAs, PICs, processors that read and interpret program instructions from internal or external memory or registers, and so forth. The computer 800 can include a memory 924, which can provide temporary or permanent storage for code to be executed by the processor 922 or for data that is processed by the processor. The memory 924 can include read-only memory (ROM), flash memory, one or more varieties of random access memory (RAM), and/or a combination of memory technologies. The various components of the computer 800 can be interconnected via any one or more separate traces, physical busses, communication lines, etc.

The computer 800 can include an interface 926, such as a communication interface or an I/O interface. A communication interface can enable the computer 800 to communicate with remote devices (e.g., other controllers or computer systems) over a network or communications bus (e.g., a universal serial bus). An I/O interface can facilitate communication between one or more input devices, one or more output devices, and the various other components of the computer 800. For example, the interface 926 can communicate with the computer components of a second computer (e.g., an integrated radio of the second computer). Exemplary input devices include touch screens, mechanical buttons, keyboards, and pointing devices. Additional exemplary output devices include a projector, electronic display screens, and speakers. The computer 800 can include a storage device 928, which can include any conventional medium for storing data in a non-volatile and/or non-transient manner. The storage device 928 can thus hold data and/or instructions in a persistent state (i.e., the value is retained despite interruption of power to the computer 800). The storage device 928 can include one or more hard disk drives, flash drives, USB drives, optical drives, various media disks or cards, and/or any combination thereof and can be directly connected to the other components of the computer 800 or remotely connected thereto, such as through the communication interface. The computer 800 can include a display 930, and can generate images to be displayed thereon. In some embodiments, the display 930 can be a vacuum fluorescent display (VFD), an organic light-emitting diode (OLED) display, or a liquid crystal display (LCD). The computer 800 can include a power supply 932 and appropriate regulating and conditioning circuitry. Exemplary power supplies include batteries, such as polymer lithium ion batteries, or adapters for coupling the computer 800 to a DC or AC power source (e.g., a USB adapter or a wall adapter).

A person skilled in the art, in view of the present disclosures, would understand various ways by which computer implementation can be incorporated into or otherwise used with the analysis system 100 of FIG. 1, other such systems either provided for herein or otherwise derivable from the present disclosures, as well as AM printers used in conjunction with such analysis system(s).

Examples of the above-described embodiments can include the following:

1. A system for analyzing properties of a printed object in-situ, in real-time, comprising:
    an inducer configured to measure one or more parameters of an object being printed by an additive manufacturing printer;
    at least one camera configured to generate one or more images of the object being printed by the additive manufacturing printer; and
    a controller configured to receive the one or more parameters of the object being printed that is measured by the inducer and the one or more images of the object being printed that is generated by the at least one camera and modify at least one of one or more print parameters, one or more environment parameters, or one or more other variables associated with one or both of the additive manufacturing printer or a print environment in response to the one or more parameters of the object being printed or the one or more images of the object being printed.

2. The system of example 1, wherein the at least one camera comprises at least one of an infrared camera or a thermal camera, and the one or more images generated by the at least one camera comprises one or more thermal images.

3. The system of example 1 or 2, wherein the at least one camera comprises at least one of a charge coupled device camera or an optical camera, and the one or more images generated by the at least one camera comprises one or more stereoscopic images.

4. The system of any of examples 1 to 3, further comprising:
   a stage configured to be a location where the object being printed is formed and configured to be moved between a printing area of the system where the additive manufacturing printer deposits material to form the object being printed and a testing area of the system where the inducer is configured to be operated to measure one or more parameters of the object being printed.

5. The system of example 4, wherein the stage is rotatable to selectively move one or more zones of the stage between the printing area of the system and the testing area of the system.

6. The system of example 4 or 5, wherein the stage is configured to move substantially along a Z-axis, substantially perpendicular to a surface area of the stage configured to be the location where the object being printed is formed, to allow the object being printed to have a third-dimension.

7. The system of any of examples 1 to 6, wherein the one or more parameters of the object being printed that is measured by the inducer comprises at least one of a hardness of material deposited to form the object being printed or a modulus of material deposited to form the object being printed.

8. The system of any of examples 1 to 7, further comprising:
   the additive manufacturing printer.

9. The system of example 8, wherein the additive manufacturing printer is configured to operate using at least one of the following techniques: powder bed fusion, material extrusion, material jetting, binder jetting, directed energy deposition, vat photopolymerization, sheet lamination, or hybrid.

10. The system of example 9, wherein the technique used comprises powder bed fusion, the system further comprising:
    at least one energy source configured to fuse powder to form the object being printed; and
    at least one moveable mirror configured to be adjusted to control a location at which the at least one energy source fuses powder to form the object being printed.

11. The system of any of examples 8 to 10, wherein the controller is configured to modify the print parameters, the print parameters being associated with the additive manufacturing printer, in response to the one or more parameters of the object being printed or the one or more images of the object being printed.

12. The system of any of examples 1 to 11, wherein the inducer is a nano-inducer.

13. The system of any of examples 1 to 12, wherein the controller is further configured to perform at least one of the following tasks:
    generate one or more topographic images of the object being printed; or
    generate one or more 3D-maps of the object being printed.

14. The system of any of examples 1 to 13, wherein a size of one or more indents formed by the inducer in the object being printed is approximately in the range of about 10 nm to about 100 μm.

15. The system of any of examples 1 to 14, wherein the inducer is configured to form the one or more indents in the object being printed with a single phase or grain of the object being printed.

16. The system of any of examples 1 to 11, wherein the inducer is a micro-inducer.

17. The system of example 16, wherein a size of one or more indents formed by the micro-inducer in the object being printed is approximately in the range of about 1 μm to about 1 mm.

18. The system of example 16 or example 17, wherein the inducer is configured to form the one or more indents in the object being printed includes different phases and crystallographic grains.

19. The system of any of examples 16 to 18, further comprising a microscope configured to image the one or more indents formed in the object being printed and measure a size of the one or more indents formed by the inducer to determine average properties of the object being printed.

20. A method of analyzing one or more mechanical properties of an object being additively manufactured, comprising:
    depositing a layer of material to form a layer of an object being additively manufactured;
    measuring at least one of a hardness of at least a portion of the layer of material or a modulus of at least a portion of the layer of material; and
    depositing another layer of material to form an additional layer of the object being additively manufactured.

21. The method of example 20, further comprising:
    imaging at least one of a portion of the layer of material or at least a portion of the another layer of material.

22. The method of example 21, wherein imaging at least one of a portion of the layer of material or at least a portion of the another layer of material further comprises:
    generating one or more thermal images of the at least one of a portion of the layer of material or a portion of the another layer of material.

23. The method of example 20 or 21, wherein imaging at least one of a portion of the layer of material or at least a portion of the another layer of material further comprises:
    generating one or more stereoscopic images of the at least one of a portion of the layer of material or a portion of the another layer of material.

24. The method of any of examples 20 to 23, further comprising:
    generating one or more topographic images of layers of the object being additively manufactured, the layers including the deposited layer of material.

25. The method of any of examples 20 to 24, further comprising:
    generating one or more 3D-maps of layers of the object being additively manufactured, the layers including the deposited layer of material.

26. The method of any of examples 20 to 25, further comprising:
  modifying at least one of one or more print parameters, one or more environment parameters, or one or more other variables associated with one or both of an additive manufacturing printer used to deposit the layer of material or a print environment in response to at least one of the measured hardness of at least a portion of the layer of material or the measured modulus of at least a portion of the layer of material.

27. The method of example 26, wherein when the method further comprises imaging at least one of a portion of the layer of material or at least a portion of the another layer of material, the method further comprises:
  modifying at least one of one or more print parameters, one or more environment parameters, or one or more other variables associated with one or both of the additive manufacturing printer used to deposit the layer of material or the print environment in response to one or more of the one or more generated thermal images, the one or more generated stereoscopic images, the one or more generated topographic images of layers of the object being additively manufactured, or the one or more generated 3D-maps of layers of the object being additively manufactured.

28. The method of any of examples 20 to 27, further comprising:
  moving a build platform on which the object being additively manufactured is built to move the object being additively manufactured between a printing area, where the depositing actions occur, and a testing area, where the measuring action occurs.

29. The method of example 28, wherein moving the build platform further comprises rotating the build platform.

30. The method of example 28 or 29, further comprising moving the build platform substantially along a Z-axis, substantially perpendicular to a surface area of the build platform on which the objected being additively manufactured is formed, to allow the object being printed to have a third-dimension.

31. The method of any of examples 20 to 30, wherein the additive manufacturing technique used to form the object being additively manufactured comprises at least one of the following techniques: powder bed fusion, material extrusion, material jetting, binder jetting, directed energy deposition, vat photopolymerization, sheet lamination, or hybrid.

32. The method of example 31, wherein the technique used comprises powder bed fusion, the method further comprising:
  directing an energy source towards a mirror to direct energy from the energy source to the object being printed to fuse powder forming the object as desired.

33. The method of example 32, further comprising moving the mirror to control a location to which the energy from the energy source is applied to the powder forming the object.

34. The method of any of examples 20 to 33, wherein measuring at least one of a hardness of at least a portion of the layer of material or a modulus of at least a portion of the layer of material further comprises forming one or more of indents in the portion of the layer of material.

35. The method of example 34, wherein an indenter column is actuated to form the one or more indents in the portion of the layer of material.

36. The method of example 34 or example 35, wherein the indenter column moves in one or more of an X-direction or a Y-direction across the portion of the layer of material to provide a scratch on the layer that generates at least one of lateral force measurements or friction data.

37. The method of any of examples 34 to 36, wherein the one or more indents is a nano-indentation, a size of the nano-indentation being approximately in the range of about 10 nm to about 100 μm.

38. The method of any of examples 34 to 37, wherein the one or more indents is a micro-indentation, a size of the micro-indentation being approximately in the range of about 1 μm to about 1 mm.

39. The method of example 38, further comprising imaging the one or more indents and measuring a size of the one or more indents formed by the high-speed inducer to determine average properties of the object being additively manufactured.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A system for analyzing properties of a printed object in-situ, in real-time, comprising:
  an inducer configured to measure one or more parameters of an object being printed by an additive manufacturing printer, the inducer being configured to form one or more indents in the object being printed;
  at least one camera configured to generate one or more images of the object being printed by the additive manufacturing printer; and
  a controller configured to receive the one or more parameters of the object being printed that is measured by the inducer and the one or more images of the object being printed that is generated by the at least one camera and modify at least one of one or more print parameters or one or more environment parameters associated with one or both of the additive manufacturing printer or a print environment in response to the one or more parameters of the object being printed or the one or more images of the object being printed.

2. The system of claim 1, further comprising:
  a stage configured to be a location where the object being printed is formed and configured to be moved between a printing area of the system where the additive manufacturing printer deposits material to form the object being printed and a testing area of the system where the inducer is configured to be operated to measure one or more parameters of the object being printed.

3. The system of claim 1, wherein the one or more parameters of the object being printed that is measured by the inducer comprises at least one of a hardness of material deposited to form the object being printed or a modulus of material deposited to form the object being printed.

4. The system of claim 1, wherein the controller is configured to modify the print parameters, the print parameters being associated with the additive manufacturing printer, in response to the one or more parameters of the object being printed or the one or more images of the object being printed.

5. The system of claim 1, wherein the inducer is a nano-inducer.

6. The system of claim 1, wherein the controller is further configured to perform at least one of the following tasks:
generate one or more topographic images of the object being printed; or
generate one or more 3D-maps of the object being printed.

7. The system of claim 1, wherein a size of the one or more indents formed by the inducer in the object being printed is in the range of 10 nm to 100 µm.

8. The system of claim 1, wherein the inducer is configured to form the one or more indents in the object being printed with a single phase or grain of the object being printed.

9. The system of claim 1, wherein the inducer is a micro-inducer.

10. The system of claim 9, wherein a size of the one or more indents formed by the micro-inducer in the object being printed is in the range of 1 µm to 1 mm.

11. The system of claim 9, wherein the inducer is configured to form the one or more indents in the object being printed to include one or more phases and crystallographic grains.

12. The system of claim 9, further comprising a microscope configured to image the one or more indents formed in the object being printed and measure a size of the one or more indents formed by the inducer to determine average properties of the object being printed.

13. A method of analyzing one or more mechanical properties of an object being additively manufactured, comprising:
depositing a first layer of material to form a first layer of an object being additively manufactured;
forming one or more indents in the portion of the layer of material;
measuring at least one of a hardness of at least a portion of the first layer of material or a modulus of at least a portion of the first layer of material; and
depositing a second layer of material to form a second layer of the object being additively manufactured.

14. The method of claim 13, further comprising:
imaging at least one of a portion of the first layer of material or at least a portion of the second layer of material.

15. The method of claim 14, wherein imaging at least one of a portion of the first layer of material or at least a portion of the second layer of material further comprises:
generating one or more thermal images of the at least one of a portion of the first layer of material or a portion of the second layer of material.

16. The method of claim 13, wherein the additive manufacturing technique used to form the object being additively manufactured comprises at least one of the following techniques: powder bed fusion, material extrusion, material jetting, binder jetting, directed energy deposition, vat photopolymerization, sheet lamination, or hybrid.

17. The method of claim 16, wherein the technique used comprises powder bed fusion, the method further comprising:
directing an energy source towards a mirror to direct energy from the energy source to the object being printed to fuse powder forming the object as desired.

18. The method of claim 13, wherein an indenter column is actuated to form the one or more indents in the portion of the layer of material.

19. The method of claim 18, wherein the indenter column moves in one or more of an X-direction or a Y-direction across the portion of the layer of material to provide a scratch on the layer that generates at least one of lateral force measurements or friction data.

* * * * *